UNITED STATES PATENT OFFICE.

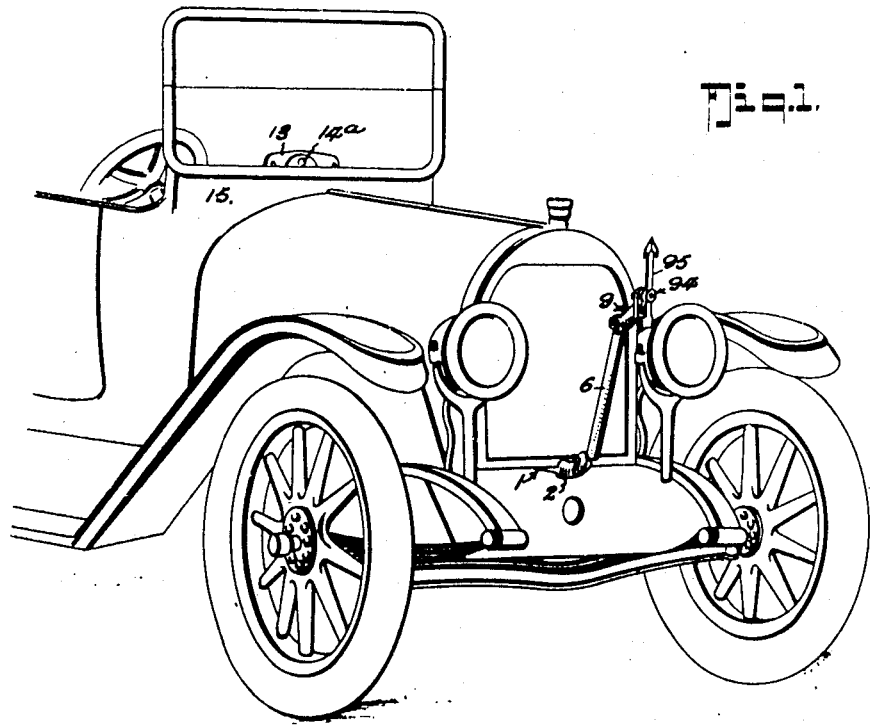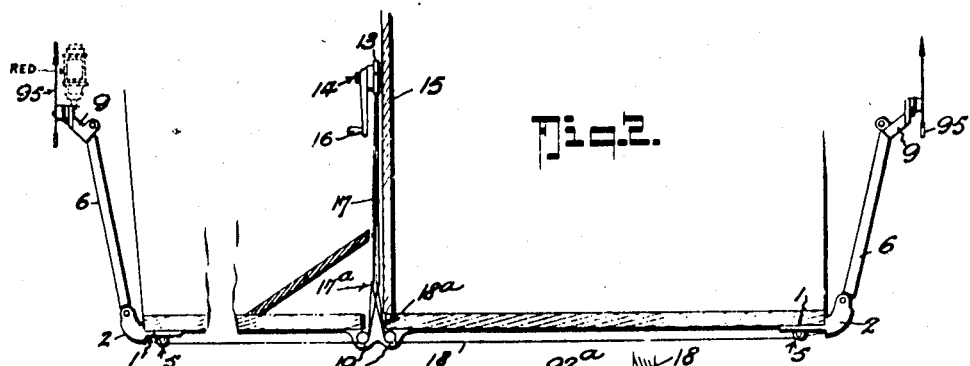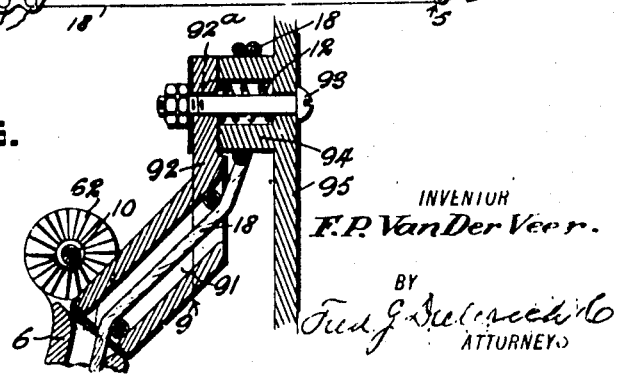

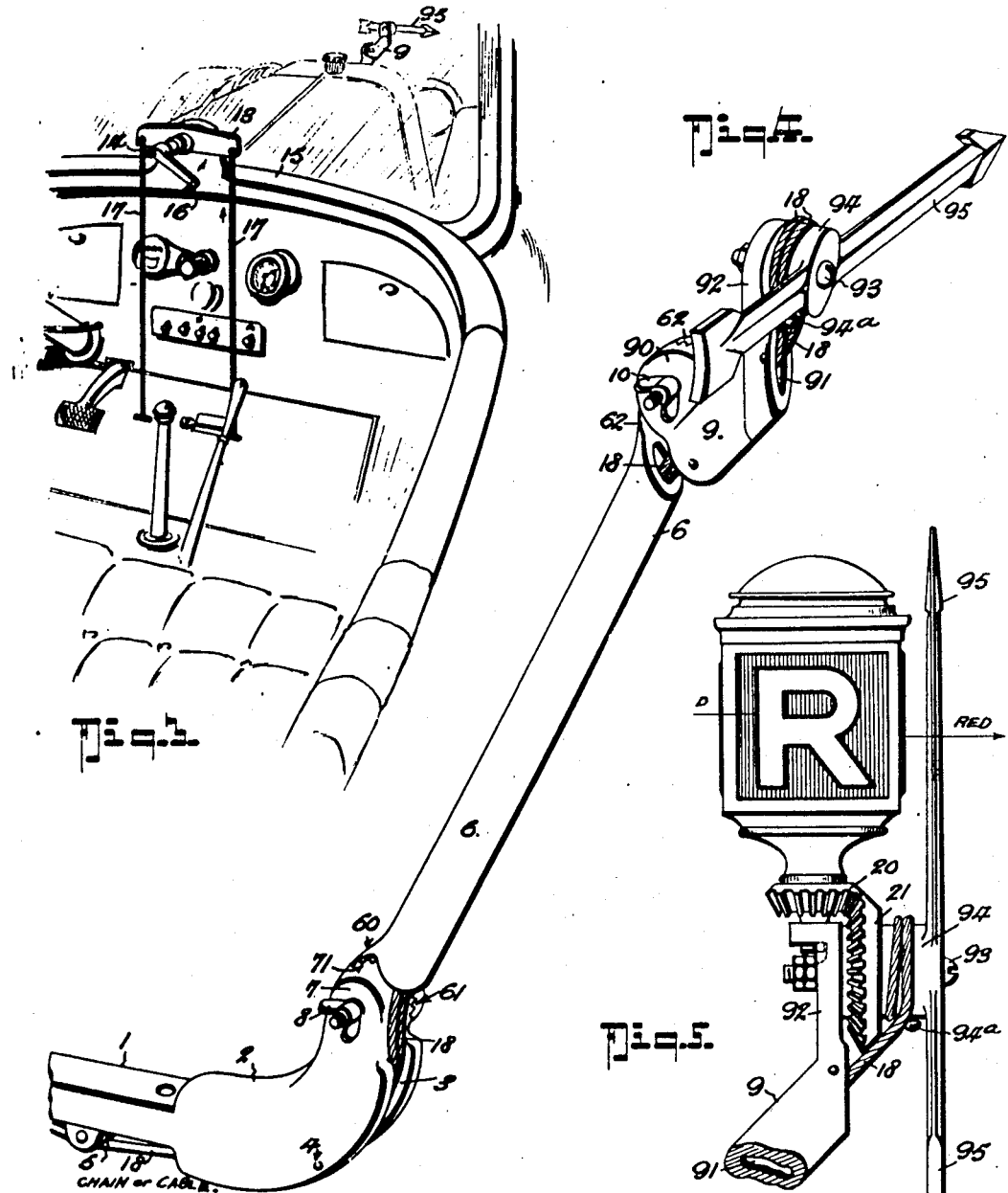

FERDINAND P. VAN DER VEER, OF INDIANAPOLIS, INDIANA.

DIRECTION-INDICATING ATTACHMENT FOR AUTOMOBILES.

1,242,393.

Specification of Letters Patent.

Patented Oct. 9, 1917.

Application filed May 2, 1916. Serial No. 94,951.

*To all whom it may concern:*

Be it known that I, FERDINAND P. VAN DER VEER, residing at Indianapolis, in the county of Marion and State of Indiana, have invented a new and Improved Direction-Indicating Attachment for Automobiles, of which the following is a specification.

My invention has for its purpose to provide a simple and economical and easily manipulated attachment for auto vehicles by which the operator can quickly and accurately indicate the direction in which it is intended to turn the vehicle and in which are included signal devices that are simultaneously set to their operative condition to indicate, both at the front and at the rear of the vehicle, the direction in which the same is about to travel.

Another object of my invention is to provide an improved attachment to auto vehicles of the character stated, in which is included means for adjustably mounting the signals so that they may be readily positioned at the front and at the rear of the vehicle where they will not interfere with any attachment, such as tires, oil tanks or other impedimenta which may be on the back of the vehicle, or lamps and other attachments such as are usually found on the front of the vehicle.

With other objects in view that will hereinafter be explained, my invention embodies the peculiar features of construction and novel combination of parts that will be hereinafter described, specifically pointed out in the appended claims and illustrated in the accompanying drawings, in which:

Figure 1 is a perspective view of my invention; the same being shown as operatively applied to an automobile.

Fig. 2 is a diagrammatic longitudinal section of an auto vehicle body with my indicator attachments applied, the indicator members being shown at their normal or neutral position.

Fig. 3 is a perspective view of part of the auto vehicle dash and the crank actuated shifting lever or cross arm device hereinafter specifically referred to.

Fig. 4 is a perspective view of the articulated bracket members and the signal arrow attached thereto, the arrow being shown as turned to one of its direction indicating positions.

Fig. 5 is a perspective view of a slightly modified form of my invention, hereinafter referred to, with the main and the supplemental indicators shown as directing to the right.

Fig. 6 is a vertical section of the supplemental bracket hereinafter referred to.

In carrying out my invention, a duplicate set of indicating devices are employed, one set being provided for the front end of the vehicle and the other set for the back end, and since the two sets of devices are constructed and operated alike, a detailed description of one set of such devices will suffice for both.

In the drawings, I have illustrated in detail the indicating devices for the front end of the motor vehicle and the same comprises a bracket 1 that is adapted to be attached to the frame of the automobile, or to any extension or attachment to such frame as the particular formation of the frame may make necessary.

Bracket 1 includes an upturned front end 2, that has a segmental guide groove 3 in which is located a transverse roller 4 that alines with a roller 5 pendent from the under side of the body of the bracket 1, the reason for which will presently appear.

6 designates a tubular member that is formed at its lower end with a lateral apertured ear 60, provided with radial notches or ratchets 61 for co-engaging with similar ratchet 71 on the apertured ear 7 formed on the bracket end 2, as shown.

8 designates a clamp screw for holding the member 6 to its adjusted position.

9 indicates a supplemental bracket that includes an apertured ear 90 which coöperates with an apertured ear 62 on the upper end of the member 6 and to which it is adjustably held by a clamp screw 10, the two members 90 and 62 having opposing serrated faces for effecting the desired tight gripping of the two parts.

Bracket 9 also includes a tubular member 91 and an arm 92 which extends upperwardly at an obtuse angle from the member 91, and which, at the upper end, has a horizontal aperture 92ᵃ in which is held a pivot screw 93, upon which is rotatably mounted a hub 94 that is a fixed part of the indicating arrow 95.

By reason of mounting the indicating arm in the manner described, the pivotal connection of the several bracket members and the tubular sections, provides for readily adjusting the parts, when applying the attachment to different cars, to bring the tubular sections in a higher or lower angle as conditions may make necessary and at the same time always leave the indicating arrow plumb.

To assist in holding the said arrow at its shifted position, a tension spring 12 is mounted in a socket in the hub 94 and takes around the screw 93 and engages the arm 92, as is clearly shown in Fig. 6.

A cross arm 13 is mounted on the upper portion 14ᵃ of a bolt 14 that is rockably mounted in the upper end of the front dash 15 and which carries an operating crank 16. 17—17 indicate rods that extend pendently from the opposite ends of the arm 13 and each of which connects a chain 18, and the said chain passes through an opening 18ᵃ in the bottom of the auto frame and extends in opposite directions over guide pulleys 19—19, one of such chains passing to the rear and the other to the front of the motor vehicle.

The chain 18 that connects to the rod 17 passes to the front of the vehicle, rides on the guide rollers on the front bracket 1, passes up through the tubular section 6 over the hub 94 to which it is secured by a stud screw 94ᵃ, from whence it passes down back through the tubular members and connects to the lower end of the rod 17ᵃ, it being understood that the chain that extends to the rear of the vehicle has its returned end secured to the rod 17, or in other words, one rear and one front chain connect to the same rod so that in manipulating the operating crank the front and rear direction indicating arms are turned at the same time in the direction desired.

The attachment thus far described will prove effective in daylight but to provide for the practical application of my invention at night, the same may be made as shown in Figs. 5 and 6 in which a supplemental indicator is shown that coöperates with the main indicating member, the arrow.

In this modified form, the supplemental indicator, which is in the nature of a lamp, has on one face the signal letter R and on the other face the signal letter L, and the said lamp, which is rotatably mounted on the upper end of the arm 92 has a beveled gear 20 that meshes with an annular gear 21 on the hub 94, the ratio of diameters of the said gears 20—21 being such, that when the indicating arrow is shifted to designate the turn to the left, the lamp is turned to bring its face with L in view and when the arrow is shifted to designate the turn to the right, the lamp face with R will then be in view and when the indicating arrow is at neutral, the lamp will show a dark side.

From the foregoing taken in connection with the drawings, the complete construction, the manner of operation and the advantages of my invention will be readily apparent.

By reason of the peculiar construction of the several parts that constitute my attachment, the same may be readily connected to an automobile in such manner that the occupant can instantly and plainly indicate to those ahead and behind the direction that he intends to take when it is desired to make a turn.

My attachment has special utility in cities having strictly enforced traffic regulations but it is also very serviceable wherever traffic is congested or where it is desirable to inform others on the road as well as those on the sidewalks, the direction of travel which is intended to be taken.

By reason of providing an indicator mechanism constructed on the lines hereinbefore described and in which is included a supplemental indicator such as is shown in Fig. 6, the use of such form of indicator will dispense with the ordinary tail light that every motor vehicle must have, since all four of the sides of the lamps can show a red light with the letters R and L appearing in white lights on the opposite or direction indicating sides of the lamp.

The supplemental indicator need not be used on the front of the vehicle since illumination from the regular lamps of the vehicle front will make the arrow plainly visible.

The advantage of using the supplemental indicator on the rear of the vehicle is apparent since the same not alone serves as an indicator for turning but also as a tail light at night.

What I claim is:

1. An attachment for motor vehicles, comprising a bracket securable to the vehicle frame to extend from the end thereof, an arm projected from the bracket, the said arm being vertically adjustable relatively to the end of the vehicle, said arm including an outer portion that is vertically adjustable independently of the main portion of the arm, a direction indicator mounted on the said outer portion of the arm, and operable from the vehicle body for imparting rotation to the said indicator.

2. An attachment for motor vehicles comprising a bracket securable to the vehicle to extend from the end thereof, an arm projected from the bracket, the said arm being vertically adjustable relatively to the front end of the vehicle, a direction indicating member attached to and having vertical adjustment on the arm, the said member being rotatively mounted relatively to the arm and arranged to be moved in opposite indicating directions and operable from the vehicle body for imparting reverse rotations to the said member.

3. An attachment for motor vehicles comprising a bracket adapted for being secured to and projected lengthwise from the vehicle body, an arm attached to the said bracket to project vertically over the end of the vehicle, said arm including an adjustably mounted upper portion, an indicating lamp mounted on the upper end of the said upper portion of the arm and horizontally rotatable with respect to the said upper arm portion, a direction indicator mounted on the said upper portion of the said arm and vertically rotatable with respect to the arm, gears that join the direction indicator and the lamp for actuating the said lamp and indicator in unison, whereby to turn the lamp in the horizontal plane as the indicator turns in the vertical plane, and means operable from the vehicle body for imparting simultaneous reverse rotary motion to the gears and the lamp and the indicator connected therewith.

4. An attachment for motor vehicles comprising a bracket adapted for being secured to and projected lengthwise from the vehicle body, an arm attached to the said bracket to project vertically over the end of the vehicle, said arm including an adjustably mounted upper portion, an indicating lamp mounted on the upper end of the said upper portion of the arm and horizontally rotatable with respect to the said upper arm portion, a direction indicator mounted on the said upper portion of the said arm and vertically rotatable with respect to the arm, gears that join the direction indicator and the lamp for actuating the said lamp and indicator in unison, whereby to turn the lamp in the horizontal plane as the indicator turns in the vertical plane, and means operable from the vehicle body for imparting simultaneous reverse rotary motion to the gears and the lamp and the indicator connected therewith, the said means comprising a rockable lever, a hub on one of the gears, a flexible pull cable whose opposite ends are attached to the opposite ends of the rocking lever and the two strands of which are guided on the bracket and the main and upper arm members and whose loop portion passes over and is made fast to the aforesaid gear hub.

FERDINAND P. VAN DER VEER.